(12) United States Patent
Shlomai et al.

(10) Patent No.: US 9,141,934 B2
(45) Date of Patent: Sep. 22, 2015

(54) TECHNIQUES FOR DEPLOYING VIRTUAL SOFTWARE APPLICATIONS ON DESKTOP COMPUTERS

(75) Inventors: Netzer Shlomai, Ra'anana (IL); Amos Lahav, Zoran (IL); Uzi Entin, Ra'anana (IL)

(73) Assignee: BlackBerry Limited, Waterloo (CA)

( * ) Notice: Subject to any disclaimer, the term of this patent is extended or adjusted under 35 U.S.C. 154(b) by 1138 days.

(21) Appl. No.: 12/419,165

(22) Filed: Apr. 6, 2009

(65) Prior Publication Data

US 2009/0254927 A1    Oct. 8, 2009

Related U.S. Application Data

(60) Provisional application No. 61/123,370, filed on Apr. 7, 2008.

(51) Int. Cl.
    *G06F 9/44* (2006.01)
    *G06Q 10/10* (2012.01)
(52) U.S. Cl.
    CPC ................................. *G06Q 10/10* (2013.01)
(58) Field of Classification Search
    CPC . G06F 13/105; G06F 13/4027; G06F 13/405; G06F 17/30038; H04L 12/462
    USPC ........... 717/173, 178; 709/107, 220–224, 227
    See application file for complete search history.

(56) References Cited

U.S. PATENT DOCUMENTS

| 6,021,438 | A  | * | 2/2000  | Duvvoori et al. ............. 709/224 |
| 6,529,985 | B1 | * | 3/2003  | Deianov et al. ............... 710/260 |
| 6,611,878 | B2 | * | 8/2003  | De Armas et al. ............ 719/328 |
| 6,907,046 | B1 | * | 6/2005  | Cook et al. .................... 370/466 |
| 7,246,351 | B2 | * | 7/2007  | Bloch et al. ................... 717/175 |
| 2002/0046301 | A1 | * | 4/2002  | Shannon et al. .............. 709/328 |
| 2003/0131245 | A1 | * | 7/2003  | Linderman ................... 713/176 |
| 2003/0208596 | A1 | * | 11/2003 | Carolan et al. ................ 709/225 |
| 2005/0240558 | A1 | * | 10/2005 | Gil et al. ........................... 707/1 |
| 2006/0031529 | A1 | * | 2/2006  | Keith, Jr. ....................... 709/227 |
| 2007/0043860 | A1 | * | 2/2007  | Pabari ........................... 709/224 |
| 2007/0050484 | A1 | * | 3/2007  | Oertig et al. .................. 709/220 |
| 2007/0050620 | A1 | * | 3/2007  | Pham et al. ................... 713/165 |
| 2009/0133013 | A1 | * | 5/2009  | Criddle et al. ................ 717/174 |

OTHER PUBLICATIONS

Denis et al, "Wide-area Communication for Grids: An integrated Solution to Connectivity, Performance and Security Problems", 2004, IEEE, pp. 98, 102.*

* cited by examiner

*Primary Examiner* — Chat Do
*Assistant Examiner* — Sergio J Curbelo, III
(74) *Attorney, Agent, or Firm* — Steven M. Greenberg, Esq.; Donna Flores, Esq.; CRGO Law

(57) ABSTRACT

A method for bridging between virtual applications and an operating system of a host computer. The method comprises retrieving virtual applications and settings of the virtual applications assigned to a user logged onto the host computer; downloading shadow files of the virtual applications assigned to the user; integrating each of the virtual applications with an operating system shell of the host computer; and causing a virtual application to be executed over the host computer when the virtual application is launched by the user.

19 Claims, 2 Drawing Sheets

TECHNIQUES FOR DEPLOYING VIRTUAL SOFTWARE APPLICATIONS ON DESKTOP COMPUTERS

CROSS-REFERENCE TO RELATED APPLICATIONS

This application claims the benefit of U.S. provisional application No. 61/123,370 filed on Apr. 7, 2008, the contents of which are herein incorporated by reference.

FIELD OF THE INVENTION

The present invention relates generally to the execution of software applications, and more particularly to a method for deploying and executing virtual applications on desktop computers.

BACKGROUND OF THE INVENTION

Personal computers (PCs) serve a multitude of software applications, features and functions. The applications provide the user with tools to accomplish tasks, such as, but not limited to, document processing, spreadsheet management, email exchanges and Internet browsing. The features and functions are commonly referred to as "personalized information" and may comprise favorite Internet websites, contacts, Internet cookies, digital signatures, background images, desktop icons, application control bars, choice of default values and other configurable settings. In general, the personalized information differs from one user to another.

Typically, software applications are installed and setup using an automated installation process. The installation process is designed to enable the integration of the new functionality into the overall organization of the operating system, as well as ensuring that the application can be safely removed. Still, as an installation process is mostly carried-out by automatic installation programs, installation and setup of software applications remain a tedious task requiring as much as hours of work.

Generally, an automatic installation program performs the following activities: a) copying application software files from a removable storage (e.g., a compact disk) to the destination computer; b) configuring the operating system's parameters by, for example, the configuration of the system registry files; c) creating the application icons; and d) deleting temporary installation files.

Typically modern operating systems, such as Microsoft® XP® or Microsoft Vista® includes a registry file for storing operating system user and application settings and options, dynamic link libraries (DLLs) which contains shared code, and named objects for naming functions shared by different processes. This structure of an operating system causes most of the challenges associated with application installation, most notable of which are:

1. Operating system Stability and Performance: Installations permanently modify the operating system (even after uninstalling) resulting in an incremental decline in operating system performance due to uninstalled leftovers (orphan files), inflated registry files, and so on.

2. Conflicts: Installations cause application conflicts due to various incompatibilities and resource sharing issues.

3. Rigidness: Applications are installed into the operating system in a way that prevents the applications from being "detached" and migrated between different computers; applications are executed exclusively within the environment in which they were initially installed.

4. Security: When applications and the operating system are fused together, internal cross contamination is almost inevitable.

These problems have resulted in information technology (IT) departments expending substantial wasted time, money and manpower on application lifecycle tasks, regression/compatibility tests, deployment and management, help desk and support issues, and more. Moreover, users cannot switch between computers and work with common applications without installing and registering those applications on each computer. Thus, the user has to configure the personalized information when switching between computers.

It would be therefore desirable to provide a solution for deploying applications to any computer from a central server without incorporating the application directly into the host computer's operating system. It would be further desirable to provide a solution for bridging between virtual applications and an operating system of a host computer.

SUMMARY OF THE INVENTION

Certain embodiments of the invention include a method for bridging between virtual applications and an operating system of a host computer. The method comprises retrieving virtual applications and settings of the virtual applications assigned to a user logged to the host computer; downloading shadow files of the virtual applications assigned onto the user; integrating each of the virtual applications with an operating system shell of the host computer; and causing a virtual application to be executed over the host computer when the virtual application is launched by the user.

Certain embodiments of the invention also include a computer readable medium having stored thereon computer executable code when executed causing a processor to perform the process of bridging between virtual applications and an operating system of a host computer. The process comprises retrieving virtual applications and settings of the virtual applications assigned to a user logged onto the host computer; downloading shadow files of the virtual applications assigned to the user; integrating each of the virtual applications with an operating system shell of the host computer; and causing to a virtual application to be executed over the host computer when the virtual application is launched by the user.

BRIEF DESCRIPTION OF THE DRAWINGS

The subject matter that is regarded as the invention is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION OF THE INVENTION

Figure 1:
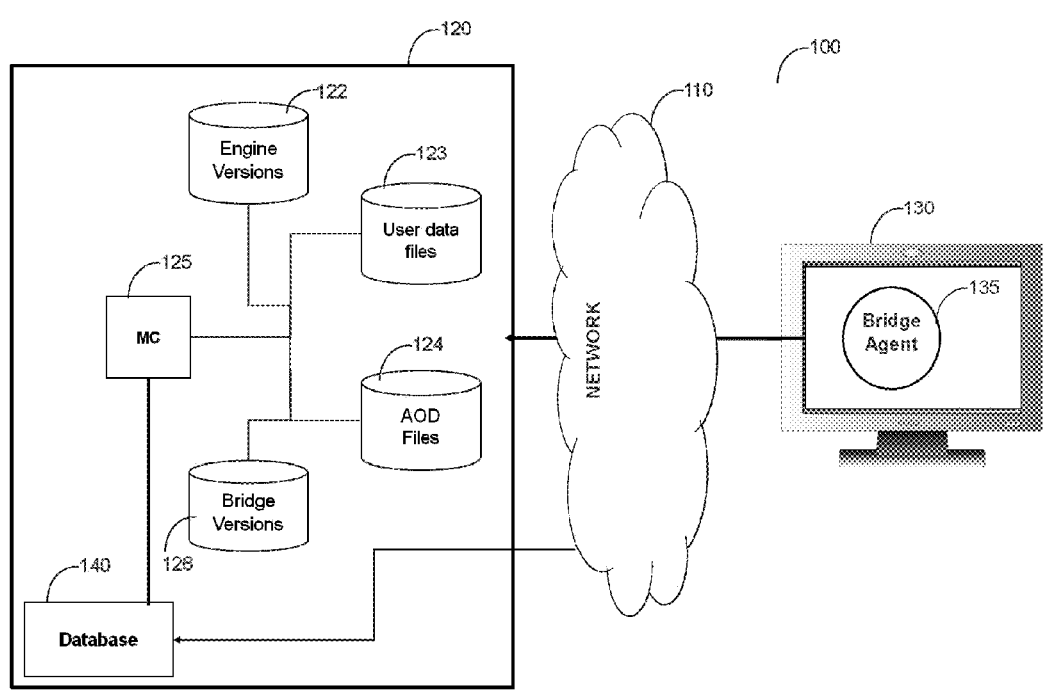
FIG. 1 is a diagram illustrating a computer network system useful in describing the principles of the invention.

The embodiments disclosed by the invention are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Certain embodiments of the invention provide techniques for deploying software applications in a virtual environment to a local desktop computer without being installed in the local computer or employing the use of a local client and a remove server. The virtual applications are integrated into the local operating system seamlessly and transparently to the user.

FIG. 1 shows a diagram illustrating a computer network system 100 useful in describing the principles of the invention. Without limiting the scope of the invention the system 100 is a simplified structure of a computer system deployed in an organization where only a single file server 120 connected through a network 110 to a single personal computer (PC) 130. It is appreciated that such systems typically includes one or more file servers and a plurality of PCs of uses in the organization. The network 120 may be, but is not limited to, a local area network (LAN), a wide area network (WAN), the Internet, or any combination thereof.

The PC 130 may be any computing device running an operating system and include, for example, a laptop computer, a smart phone, a personal digital assistance (PDA), and the like. The operating system maybe, but is not limited to, a Windows® XP®, Windows Vista®, Linux®, and the like. In accordance with an embodiment of the invention the PC 130 runs a bridge agent 135 which is a virtual service that enables central deployment of virtual software applications on the PC 130 without altering or making changes to the PC 130. Specifically, the bridge agent 130 retrieves, from the file server 120, files of virtual applications assigned to a user of the PC 130 and cause the execution of these applications over the PC 130. In addition, the bridge agent 135 performs shell integration by binding the virtual applications to the operating system shell. An operating system shell which provides access to the kernel services of the operating system. The PC 130 may be a locked-down computer which is a computer being operated by a user account or process that does not have full administrator permissions.

The virtual applications function as if they were installed on the PC 130 and are available online and/or offline. In accordance with an embodiment of the invention, a virtual application consists of the following files: a virtual engine, a user data file, and an application on demand (AOD) file. The virtual engine is an executable computing environment with its own read/write file system and registry, dynamic link library (DLL) repositories, and named objects. An AOD file includes all of the resources an application needs to run, such as an internal virtual services manager, a digital rights management layer, a connectivity layer, and a protection layer. The protection layer seals the virtual applications from the environment of the host operating system of the PC 130 and provides the virtual applications with the required function calls and returned data and further preventing any data from being written to the host operating system. The connectivity layer enables the virtual application to communicate with other virtual applications and define the integration with the operating system shell. For example, the connectivity layer includes registry keys and files that contain shell components, such as file extensions, programs files links, system tray, quick launch, and so on.

The virtual applications executed over the PC 130 do not write data, files, registry keys, and so on to the host operating system, but instead to the user data file that contains all the data written during the time the virtual application was active. The user data file may also include modified preferences, temporary files, registry changes, user files (e.g., documents, music, video, etc.), and so on. User data files may be encrypted. A detailed discussion on the structure of the virtual applications utilized by the invention and their execution can be found in U.S. patent application Ser. No. 11/697,700 filed Apr. 6, 2007 and U.S. application Ser. No. 11/697,702 filed Apr. 6, 2007, the contents of which are incorporated by reference herein in their entirety.

The virtual engines are stored, per virtual application, in a storage unit 122, the user data files are saved, per user and per application, in a storage unit 123, and the AOD files are maintained in a storage unit 124. In other implementations user data files, AOD files, and virtual engine files may be stored locally on the user PC. All storage units 122, 123 and 124 are part of the file server 120 which includes a management console 125 and a storage unit 126 for maintaining different versions of the bridge agents 135, each version may be per user or group of users. The management console 125 enables, together with the bridge agent 135, centrally deploying virtual applications and complete desktop configurations to end users over the network 110. Once the AOD files are uploaded to the file server 120, the management console 125 extracts the connectivity layer of each file and saves it in a different file (hereinafter the "shadow file").

In addition, the management console 125 accesses a database 140 for the purpose of obtaining virtual applications and settings assigned to a directory service entity. A directory service entity may be defined as a combination of any of a computer, a user, security groups, a group of users, and so on. The settings are used for local processing and integration into the host operating system and may include, but are not limited to, security permissions and the mode of each virtual application assigned to the user of PC 130. A virtual application's mode may be either online and offline. When the user logs onto the server, the virtual application's file can be either downloaded completely from the file server 120, after which the user can work offline without being connected to the server 120. Alternatively, the virtual application's file can be downloaded by streaming as needed when the user stays connected to the server 120 in an online mode. In one embodiment of the invention the database 140 may be any lightweight directory access protocol (LDAP) based directory service (such as an Active Directory provided by Microsoft). The process of deploying virtual applications to the PC 130 begins when a user logs into the database 140 and based upon login credentials a version of a bridge agent 135 that should be assigned to the PC 130 is determined. Thereafter, the designated version of the bridge agent 135 is downloaded from the storage unit 126 to the PC 130. It should be noted that the bridge agent 135 is not installed in the PC 130. Rather, the agent 135 is an executable file that once downloaded can execute the process of bridging between virtual applications and the host operating system of the PC 130. This process will be described in greater detail below. It should be further noted that the pre-installed applications can co-exist with virtual applications (which are not installed) in the PC 130. The co-existence is enabled by the agent 135. Furthermore, in order to deploy new applications to the PC 130 or change the applications assigned to a user of PC 130, a system administrator needs to assign or de-assign applications to directory service entities and does not need to uninstall and/or install new applications. The new bridge agent will be downloaded to the PC 130 when the user logs on. It should be appreciated that this approach allows lowering the total cost of ownership (TCO) of information technology deployment.

Figure 2:
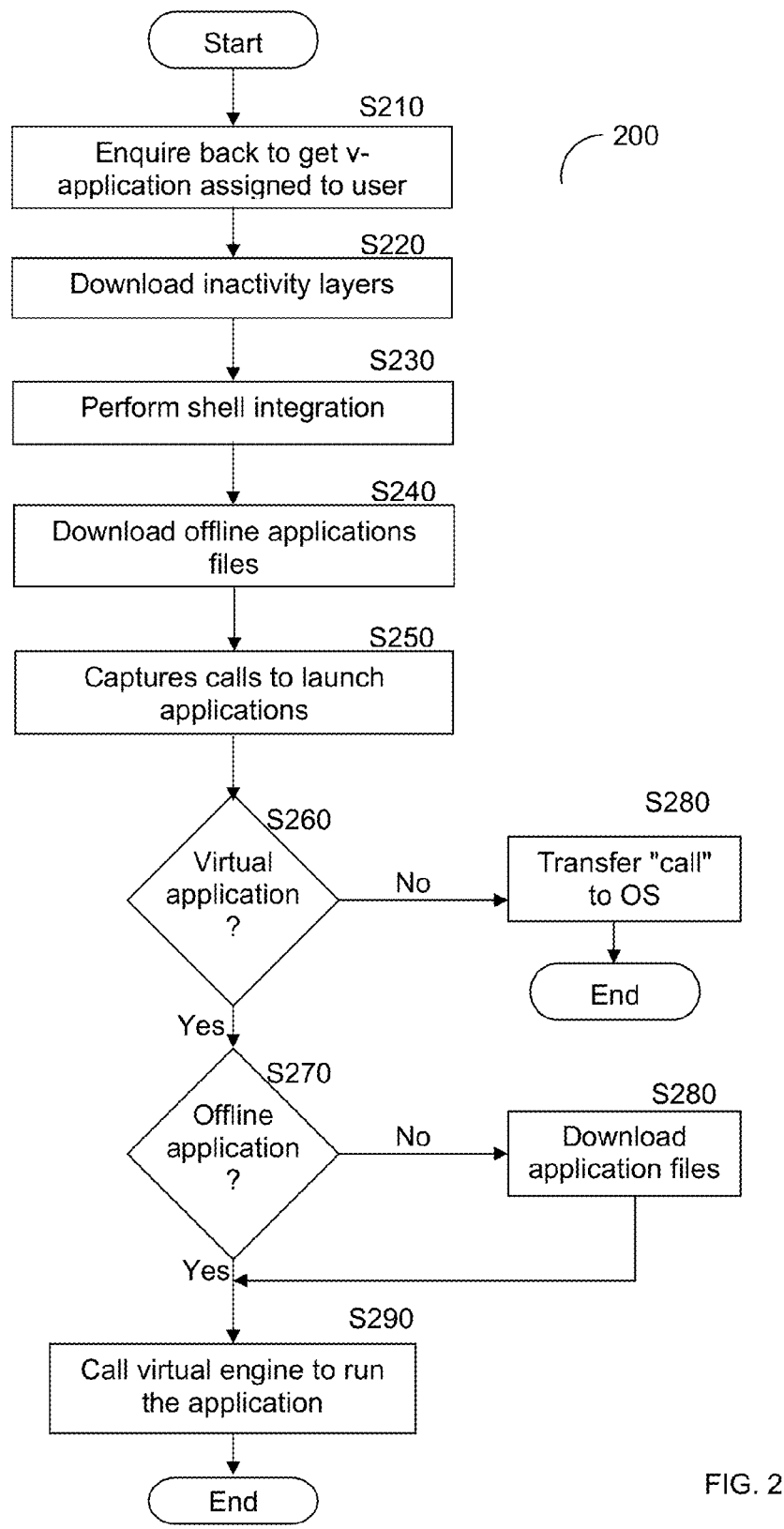
FIG. 2 is a flowchart describing the process for bridging between virtual applications and the host operating system implemented in accordance with an embodiment of the invention.

FIG. 2 shows an exemplary and non-limiting flowchart 200 describing the process for bridging between virtual applications and the host operating system of the PC 130 implemented in accordance with an embodiment of the invention. The execution begins when the bridge agent 135 is fully downloaded to the PC 130. As mentioned above the bridge agent 135 is an executable file, therefore no installation is required. At S210, the bridge agent 135 enquires back to the management console 125 as to which virtual applications and applications' settings are assigned to a user of the PC 130. Specifically, for each virtual application the management console 125 replies with names of the AOD file, virtual engine version, and user data file that should be downloaded. That is, contents of these files are not yet downloaded to the agent 135.

At S220, the shadow files including the connectivity layers of all virtual applications are downloaded to the bridge agent 135. The connectivity layer defines the integration functions with the operating system shell and enabling graphically displaying interface elements of each virtual application.

At S230, each virtual application is integrated into the operating system shell of the PC 130 according to its connectivity layer. The shell integration includes binding an application's interface elements with the operating system shell, i.e., integration with non-virtual environment. These interface elements include start menu items, desktop items, file type associations, right click menu options, integration with native folders (e.g., My Document), and so on. In addition, the shell integration creates uninstall information (e.g., "Add Remove Program" entry) and intercommunication information with non-virtual services and applications. The uninstall information is created merely to allow current licensing tools to keep track of deployed virtual applications. The integration with the operating system shell is completely transparent, i.e., it does not add or change any registry keys and or any of the operating system files. In one embodiment of the invention the shell integration may be achieved by injecting, using a DLL process within the bridge agent 135, the connectivity layer to a host explorer process of the shell, and then refreshing the host explorer to present the integrated interface elements. Once the shell integration process is completed, the virtual applications are displayed and can be launched as they were actually installed in the PC 130, thus ensuring the same user experience and behavior as normally installed applications. For example, if a virtual application is a WinZip the shell integration process will cause the WinZip's icon to be display on the user's desktop, an entry to be added to the "Start" menu, and all "zip" type files to be displayed with the WinZip icon. In addition, any right-click on a WinZip's icon opens menu having entries typically associated with this application.

At S240, optionally, files (i.e., user data, AOD, and virtual engine) of virtual applications set as "offline applications" are downloaded. The bridge agent 135 downloads the files all at once or streams them at block level to be locally processed on the PC 130. At S250, when an application either a virtual or non-virtual application is launched through, for example, a desktop icon, a start menu shortcut or a right click option, the bridge agent 135 captures the call to execute the launched application. At S260, a check is made to determine if the launched application is a virtual application, and if so execution continues with S270; otherwise, at S280 the captured call is transferred to the operating system. This sub-process enables the co-existence of virtual and non-virtual (installed) applications and further the inter-connection between virtual and non-virtual applications. This allows, for example, executing a non-virtual application from a virtual environment. At S270, it is checked if the virtual application is defined as an offline application, and if so execution proceeds to S290; otherwise, at S280 the virtual application's files (e.g., the user data, AOD, and virtual engine) are loaded to a memory of the PC 130 using the bridge agent 135. The bridge agent 135 retrieves the files from the file server all at once or streams them at block level to be locally processed on the PC 130. At S290 the bridge agent 135 calls the virtual engine of the virtual application which executes the virtual application over the PC 130.

It should be noted that during execution of the virtual application changes to user data are streamed to the file server 120 to be saved in the storage unit 123. Therefore, the bride agent 135 is capable of performing a bi-directional streaming. Specifically, user data files can be synchronized between a client PC 130 and file server 120 to provide a complete roaming profile of virtual applications. The roaming profile allows the association of applications and setting with a user and not with the PC 130 from which the user logs on. Therefore, applications are downloaded to the PC 130 based on logged username. In addition, user data files are synchronized with the file server 120.

The principles of the invention may be implemented as hardware, firmware, software or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What we claim is:

1. A method for bridging between virtual applications and an operating system of a host computer, comprising:

downloading a bridge agent from a central server to the host computer as an uninstalled executable file operable exclusively on the host computer, not integrated within the host computer's operating system shell, the bridge agent being configured to bridge between the virtual applications and the operating system of the host computer;

wherein each of the virtual applications includes the following files: a virtual engine, a user data file, and an application-on-demand (AOD) file;

retrieving, by the bridge agent operable on the host computer, virtual applications and settings, of the virtual applications assigned to a user logged onto the host computer;

downloading, to the bridge agent operable on the host computer, shadow files of the virtual applications assigned to the user, wherein the shadow files comprise connectivity layers of virtual applications assigned to the user, wherein a connectivity layer defines integration functions with an operating system shell of the host computer enabling display of interface elements of a respective virtual application;

binding interface elements of each of the virtual applications to the operating system shell of the host computer by injecting, via a dynamic link library (DLL) process with the bridge agent, the connectivity layer to a host process of the operating system shell, wherein the integration of the virtual applications does not modify registry keys and files of the operating system;

and causing a virtual application to be executed over the host computer when the virtual application is launched by the user.

2. The method of claim 1, wherein retrieving the virtual applications and the settings, of the virtual applications further comprising:

enquiring a file server as to virtual applications assigned to the logged user;

retrieving file names of files of each of the virtual applications;

and retrieving settings of each of the virtual applications.

3. The method of claim 2, wherein the settings of a virtual application includes at least: a virtual application mode and security permissions.

4. The method of claim 3, wherein the mode of a virtual application includes an online mode wherein files of a virtual application are loaded into a memory of the host computer post launch of the virtual application and an offline mode wherein files of a virtual application are downloaded to the host computer prior to the launch of the virtual application.

5. The method of claim 2, wherein causing the virtual application to be executed further comprising:

capturing a system call to execute a launched application;

checking if the launched application is a virtual application;

when the launched application is not a virtual application transferring the system call to the operating system;

otherwise, determining if a mode of the launched virtual application is an offline mode;

and executing the virtual engine of the launched virtual application if the launched virtual application is set to an offline mode.

6. The method of claim 5, further comprising:

downloading files of the launched virtual application when the launched virtual application is set to an online mode;

and executing the virtual engine of the launched virtual application.

7. The method of claim 5, wherein the files of virtual applications set to an offline mode are loaded to the memory when the operating system shell integration is completed.

8. The method of claim 7, wherein files of virtual applications are not installed in the host computer.

9. The method of claim 7, wherein retrieving application files further comprising: streaming application files from a file server to the host computer.

10. The method of claim 7, further comprising streaming user data from the host computer to the file server.

11. The method of claim 1, wherein the interface elements include at least one of: start menu items, desktop items, file type associations, right-click menu options, and integration with native folders of the operating system.

12. The method of claim 11, wherein integrating each of the virtual applications with the operating system shell of the virtual computer further comprising: binding interface elements of virtual applications with a non-virtual environment of the operating system shell.

13. The method of claim 1, wherein the virtual applications and settings are assigned to the user by a system administrator and wherein such assignment may be performed to a service entity including at least a host computer, a user, security groups, a group of users, or combination thereof.

14. A non-transitory computer readable medium having stored thereon computer executable code, when executed, causing a processor to perform the process of bridging between virtual applications and an operating system of a host computer, comprising:

retrieving, by a bridge agent operable on the host computer, virtual applications and settings, of the virtual applications assigned to a user logged onto the host computer, wherein the bridge agent is an uninstalled executable file operable exclusively on the host computer, not integrated within the host computer's operating system;

wherein each of the virtual applications consists of the following files: a virtual engine, a user data file, and an application-on-demand (AOD) file;

downloading, to the bridge agent operable on the host computer, shadow files of the virtual applications assigned to the user, wherein the shadow files comprise connectivity layers of virtual applications assigned to the user, wherein a connectivity layers defines integration functions with an operating system shell enabling display of interface elements of a respective virtual application;

binding interface elements of each of the virtual applications to the operating system shell of the host computer by injecting, via a dynamic link library (DLL) process with the bridge agent, the connectivity layer to a host process of the operating system shell, wherein the integration of the virtual applications does not modify registry keys, and files, of the operating system;

and causing a virtual application to be executed over the host computer when the virtual application is launched by the user.

15. The non-transitory computer readable medium of claim 14, wherein retrieving the virtual applications and the settings of the virtual applications further comprising:

enquiring a file server as to virtual applications assigned to the logged user;

retrieving file names of files of each of the virtual applications;

and retrieving settings of each of the virtual applications.

16. The non-transitory computer readable medium of claim 14, wherein integrating each of the virtual applications with the operating system shell of the virtual computer further comprising: binding interface elements of virtual applications with a non-virtual environment of the operating system shell.

17. The non-transitory computer readable medium of claim 14, wherein causing the virtual application to be executed further comprising:

capturing a system call to execute a launched application;

checking if the launched application is a virtual application;

when the launched application is not a virtual application transferring the system call to the operating system;

otherwise, determining if a mode of the launched virtual application is an offline mode;

executing the virtual engine of the launched virtual application if the launched virtual application is set to an offline mode;

retrieving files of the launched virtual application when the launched virtual application is set to an online mode;

and executing a virtual engine of the launched virtual application.

18. The non-transitory computer readable medium of claim 17, wherein downloaded files of virtual applications and the bridge agent are not installed in the host computer.

19. A host computer for bridging between virtual applications and an operating system, comprising:

a memory configured to store a program including instructions;

and a processor configured to execute the program to cause the host computer to:

retrieve, by a bridge agent operable on the host computer, virtual applications and settings, of the virtual applications assigned to a user logged onto the host computer, wherein the bridge agent is an uninstalled executable file operable exclusively on the host computer, not integrated within the host computer's operating system;

wherein each of the virtual applications consists of the following files: a virtual engine, a user data file, and an application-on-demand (AOD) file;

download, to the bridge agent operable on the host computer, shadow files of the virtual applications assigned to the user, wherein the shadow files comprise connectivity layers of virtual applications assigned to the user, wherein a connectivity layers defines integration functions with an operating system shell enabling display of interface elements of a respective virtual application;

binding interface elements of each of the virtual applications to the operating system shell of the host computer by injecting, via a dynamic link library (DLL) process with the bridge agent, the connectivity layer to a host process of the operating system shell, wherein the integration of the virtual applications does not modify registry keys, and files, of the operating system;

and cause a virtual application to be executed over the host computer when the virtual application is launched by the user.

* * * * *

UNITED STATES PATENT AND TRADEMARK OFFICE
CERTIFICATE OF CORRECTION

| | | |
|---|---|---|
| PATENT NO. | : 9,141,934 B2 | Page 1 of 1 |
| APPLICATION NO. | : 12/419165 | |
| DATED | : September 22, 2015 | |
| INVENTOR(S) | : Netzer Shlomai, Amos Lahav and Uzi Entin | |

It is certified that error appears in the above-identified patent and that said Letters Patent is hereby corrected as shown below:

Title Page, item (73), the name of the Assignee as shown on the face of the patent should read WATCHDOX LTD. The residence of Assignee should read PETAH TIKVA, ISRAEL.

Signed and Sealed this
Twenty-first Day of June, 2016

Michelle K. Lee
*Director of the United States Patent and Trademark Office*